United States Patent
Narayanan et al.

(10) Patent No.: US 12,541,607 B2
(45) Date of Patent: Feb. 3, 2026

(54) SYSTEMS AND METHODS TO PROTECT SENSITIVE DATA AT PROCESSING INTERMEDIARIES

(71) Applicant: International Business Machines Corporation, Armonk, NY (US)

(72) Inventors: Iyengar Sridhar Narayanan, Markham (CA); Ahamed Jalaldeen Shahul Hamid, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 17/540,747

(22) Filed: Dec. 2, 2021

(65) Prior Publication Data

US 2023/0177181 A1  Jun. 8, 2023

(51) Int. Cl.
*G06F 21/62* (2013.01)
*G06F 21/60* (2013.01)
(Continued)

(52) U.S. Cl.
CPC ........ *G06F 21/6209* (2013.01); *G06F 21/602* (2013.01); *G06F 21/6254* (2013.01);
(Continued)

(58) Field of Classification Search
CPC ............... G06F 21/6209; G06F 21/602; G06F 21/6254; G06F 21/6263; G06F 21/78; G06F 21/107
See application file for complete search history.

(56) References Cited

U.S. PATENT DOCUMENTS 9,547,769 B2  1/2017  Aissi et al.
10,289,868 B2 * 5/2019  Jagadish ............... G16H 10/60
(Continued)

FOREIGN PATENT DOCUMENTS

CN   116226875 A   6/2023
DE   102012106081 A1   1/2014
(Continued)

OTHER PUBLICATIONS

Yadav, V., "Ensuring the Security of Your APIs", DZONE, Jul. 2019, 12 pages, https://dzone.com/articles/how-do-you-ensure-security.
(Continued)

*Primary Examiner* — Hee K Song
(74) *Attorney, Agent, or Firm* — Scully, Scott, Murphy & Presser, P.C.

(57) ABSTRACT

A system, platform, program product, and/or method for protecting sensitive data including decrypting an incoming message comprising a base message and the sensitive electronic data; removing the sensitive electronic data from the incoming message to create a stripped message; encrypting the sensitive electronic data; storing the encrypted sensitive electronic data in In-Memory Cache; and permitting the stripped message to be further processed without the sensitive electronic data. The system, platform, program product and/or method in an embodiment further includes: retrieving from the In-Memory Cache the encrypted sensitive electronic data; decrypting the encrypted sensitive electronic data retrieved from the In-Memory Cache; and injecting the sensitive electronic data into the stripped message. In a further aspect the system, platform, program product and/or method further includes encrypting the outbound message with the sensitive electronic data and permitting the
(Continued)

encrypted outbound message with the sensitive electronic data to reach an external computing system.

20 Claims, 7 Drawing Sheets

(51) Int. Cl.
  *G06F 21/78* (2013.01)
  *G06F 21/10* (2013.01)

(52) U.S. Cl.
  CPC .......... *G06F 21/6263* (2013.01); *G06F 21/78* (2013.01); *G06F 21/107* (2023.08)

(56) References Cited

U.S. PATENT DOCUMENTS

| | | |
|---|---|---|
| 10,333,899 B2 | 6/2019 | Kilgallon |
| 10,425,388 B2 | 9/2019 | Zhao |
| 10,541,975 B2 | 1/2020 | Rajnish |
| 10,904,218 B2 | 1/2021 | Muttik |
| 2002/0111920 A1 | 8/2002 | Tresser |
| 2009/0169010 A1* | 7/2009 | Dodd ..................... H04L 9/083 380/277 |
| 2015/0213288 A1* | 7/2015 | Bilodeau ............. G06F 21/6254 726/26 |
| 2016/0132696 A1 | 5/2016 | Vidhani et al. |
| 2017/0220818 A1 | 8/2017 | Nagasundaram et al. |
| 2021/0366585 A1 | 11/2021 | Molapo et al. |
| 2022/0070666 A1* | 3/2022 | Hua ....................... H04L 9/3271 |
| 2022/0245283 A1* | 8/2022 | Springer ................ H04W 12/02 |

FOREIGN PATENT DOCUMENTS

| | | | |
|---|---|---|---|
| JP | 2023-082700 A | 6/2023 | |
| WO | WO-2014142996 A1 * | 9/2014 | ......... H04L 63/0421 |

OTHER PUBLICATIONS

Burnside, M., et al., "F3ildCrypt: End-to-End Protection of Sensitive Information in Web Services", Information Security: 12th International Conference, ISC 2009, 15 pages, https://angelosk.github.io/Papers/2009/f3ildcrypt-isc.pdf.

* cited by examiner

SYSTEMS AND METHODS TO PROTECT SENSITIVE DATA AT PROCESSING INTERMEDIARIES

TECHNICAL FIELD

The present invention relates to protecting sensitive data at processing intermediaries, for example transaction processing intermediaries that facilitate exchange between transaction originators and service providers.

BACKGROUND

Industries, for example, service industries, are increasingly driven by ecosystems that enable entities to access data and services provided by service providers, for example for processing or to provide value-add services. For example, the financial services industry increasingly has intermediaries that enable access to services and data provided by service providers that may be other financial institutions or Clearing and Settlement Mechanisms (CSMs). There are intermediaries that facilitate inter-connectivity between ecosystem participants, and in circumstances provide full life cycle processing of transactions through integration with back-end processing services provided by Service Providers such as, for example, financial institutions, financial technology entities, CSMs, etc.

Such ecosystems are complex due to numerous protocols, data formats, scheme/CSM driven rules, etc. For example, the global regulatory frameworks for data security and privacy are complex and place significant burdens on industry participants to ensure customer data is protected through the processing chain, preferably the entire processing chain. However, financial institutions and other service and good providers need to leverage and use intermediaries in the processing chain. Financial institutions and other entities, e.g., originators, that have an obligation to protect customer data, and comply with regulatory requirements on data security and privacy, need to be able to leverage intermediaries to offload and/or outsource processing as well as to provide value-added services without risking the breach or exposure of such data at the intermediaries. By leveraging the strengths and capabilities of processing intermediaries, financial institutions, entities and/or originators can achieve cost efficiencies and develop new products and services.

Intermediaries typically receive relevant transaction details to provide value-added processing services, however, the intermediaries should not see or have access to sensitive information and credentials that may be part of the transaction payload (e.g., the inbound message). The intermediaries should also not store such sensitive data in any of their processing systems and yet typically has to transmit such sensitive data down stream to processing services unchanged. There is a need to insure that intermediaries treat such data opaquely in their processing systems and have the ability to transmit such data unchanged with other transaction details to downstream processors and service providers.

SUMMARY

The summary of the disclosure is given to aid understanding the processing of data for protecting sensitive data, including highly sensitive data, at processing intermediaries, for example transaction processing intermediaries, to facilitate exchange between originators and service providers (e.g., exchange between transaction originators and service providers), and not with an intent to limit, the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, the platform, the architectural structure, and/or methods described to achieve different effects. In this regard it will be appreciated that the disclosure presents and describes one or more inventions, and in aspects includes numerous inventions as defined by the claims.

A system, platform, tool, framework, computer program product, and/or method is disclosed according to one or more embodiments for protecting sensitive data at intermediaries, and in an approach passing such sensitive data on to further service providers. A system, tool, framework, computer-program product and/or for protecting sensitive electronic data is disclosed where the method includes in one or more embodiments: decrypting an incoming message comprising a base message and the sensitive electronic data; removing the sensitive electronic data from the incoming message to create a stripped message; encrypting the sensitive electronic data; storing the encrypted sensitive electronic data in In-Memory Cache; and permitting the stripped message to be further processed without the sensitive electronic data. In an approach, the incoming message is decrypted using an Interceptor and/or in another the incoming message is decrypted using security keys exchanged with an external system that transmitted the incoming message. The security keys in an aspect are exchanged out-of-band with the incoming message. In an embodiment, a Hardware Security Module is used to encrypt the sensitive electronic data with an encryption key. In one or more approaches, the encrypted sensitive data is stored in In-Memory Cache for a temporary time period that is at least one of a group consisting of: a fixed time period, a predefined time period, a predetermined time period, an adjustable time period, a programmable time period, and combinations thereof.

Removing the sensitive electronic data from the incoming message in one or more embodiments includes: identifying sensitive electronic data to check for in the decrypted incoming message; and checking the decrypted incoming message for the identified sensitive electronic data; and in an aspect using an attribute list to identify the sensitive electronic data in the decrypted incoming messages, where in a further approach further includes comparing the decrypted incoming message to sensitive electronic data identified in the attribute list. In an embodiment, the attribute list is a configurable JSON Attribute List where attributes can be at least one of a group consisting of an added attribute, a modified attribute, a removed attribute, and combinations thereof from the JSON Attribute List. The system, tool, platform, programming product, and/or method further includes supplying the encryption key in an embodiment by an external system that transmitted the incoming message, and/or in an aspect invoking an intermediary computing system REST API. In one or more embodiments, an interceptor: decrypts an incoming message comprising a base message and sensitive electronic data; removes the sensitive electronic data from the incoming message to create a stripped message; encrypts the sensitive electronic data; stores the encrypted sensitive electronic data in In-Memory Cache; and permits the stripped message to be further processed without the sensitive electronic data.

In one or more embodiments, a system, platform, tool, programming instructions and/or method further includes: retrieving from the In-Memory Cache the encrypted sensitive electronic data; decrypting the encrypted sensitive electronic data retrieved from the In-Memory Cache using a Hardware Security Module; and injecting the sensitive electronic data into the stripped message. In a further aspect the system, platform, tool, programming instructions and/or method further includes encrypting the outbound message with the sensitive electronic data and permitting the encrypted outbound message with the sensitive electronic data to reach an external computing system. In an approach an inceptor encrypts the outbound message with a security key exchanged with an external system that transmitted the incoming message. In a further approach, an interceptor using a Hardware Security Module (HSM) is used to decrypt the encrypted sensitive electronic data retrieved from the In-Memory Cache. In a further embodiment, the encrypted outbound message with the sensitive electronic data is permitted to reach an external computing system; and at least one of the stripped message without containing the sensitive electronic data or an enriched stripped message comprising the stripped message further processed but without containing the sensitive electronic data is permitted to reach another external computing system.

The foregoing and other objects, features, and/or advantages of the invention will be apparent from the following more particular descriptions and exemplary embodiments of the invention as illustrated in the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. The claims should not be limited to the precise arrangement, structures, systems, platforms, architectures, modules, functional units, assemblies, subassemblies, circuitry, configurations, embodiments, programming, features, aspects, methods, processes, techniques, devices and/or details shown, and the arrangements, structures, systems, platforms, architectures, modules, functional units, assemblies, subassemblies, circuitry, configurations, embodiments, programming, features, aspects, methods, processes, techniques, devices and/or details shown may be used singularly or in combination with other arrangements, structures, systems, platforms, architectures, modules, functional units, assemblies, subassemblies, circuitry, configurations, embodiments, programming, features, aspects, methods, processes, techniques, devices and/or details. The accompanying drawings include the following figures where:

DETAILED DESCRIPTION

Figure 1:
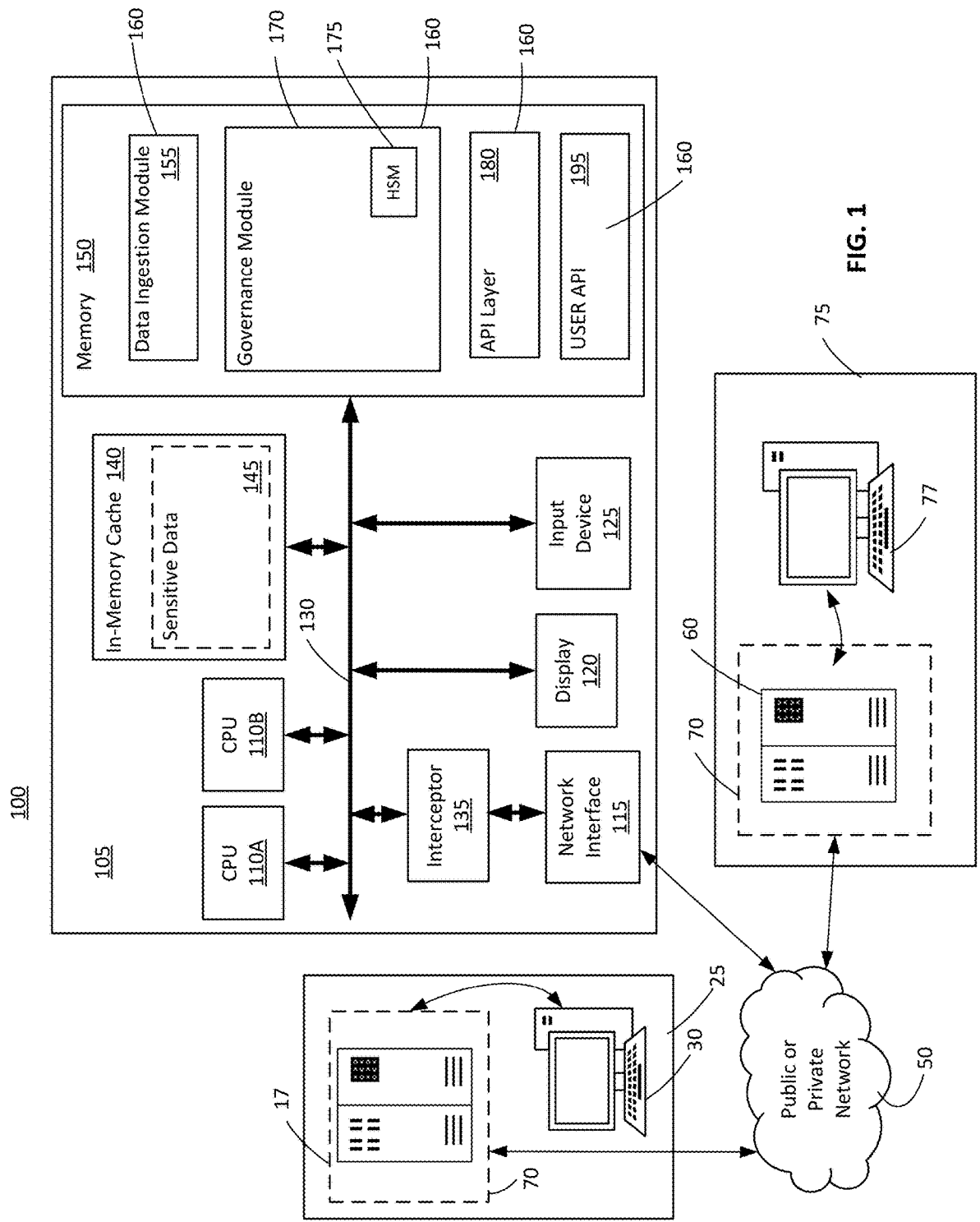
FIG. 1 illustrates a schematic block diagram of one illustrative implementation of a system to prevent visibility by intermediaries to, and protect, sensitive data according to an embodiment of the disclosure.

The following description is made for illustrating the general principles of the invention and is not meant to limit the inventive concepts claimed herein. In the following detailed description, numerous details are set forth in order to provide an understanding of the system, platform, tool, framework, computer program product, method, and/or techniques to prevent visibility by intermediaries and protect sensitive data not required for processing at the intermediaries, that, for example, facilitate exchange between originators and service providers, however, it will be understood by those skilled in the art that different and numerous embodiments of the system, platform, tool, framework, and/or its method of operation may be practiced without those specific details, and the claims and disclosure should not be limited to the features, aspects, arrangements, structures, systems, assemblies, subassemblies, platforms, architectures, configurations, modules, functional units, circuitry, embodiments, programming, processes, methods, techniques, and/or details specifically described and shown herein. Further, particular features, aspects, arrangements, structures, systems, assemblies, subassemblies, platforms, architectures, modules, functional units, circuitry, embodiments, programming, methods, processes, techniques, details, etc. described herein can be used in combination with other described features, aspects, arrangements, structures, systems, assemblies, subassemblies, platforms, architectures, modules, functional units, circuitry, embodiments, programming, techniques, methods, processes, details, etc. in each of the various possible combinations and permutations.

The following discussion omits or only briefly describes conventional features of information processing systems and data networks, including computer-implemented systems used for example by processing intermediaries to facilitate exchanges between originators and service providers, which should be apparent to those skilled in the art. It is assumed that those skilled in the art are familiar with data processing systems, including interaction between data processing systems by intermediaries particularly to facilitate exchanges between originators and service providers, for example transaction processing at intermediaries that facilitate exchange between transaction originators and service providers. It may be noted that a numbered element is numbered according to the figure in which the element is introduced, is typically referred to by that number throughout succeeding figures, and like reference numbers generally represent like parts of the illustrative embodiments of the invention.

The disclosure in one or more embodiments describes a system, platform, tool, framework, computer program product, and/or method for intermediaries to perform transaction processing, e.g., financial transaction processing, without having visibility or access to sensitive data not required for processing in the intermediary systems and ensuring client and/or end user confidentiality. The system, platform, tool, framework, computer program product, and/or method for intermediaries preferably is operable whether the intermediary deploys the solution on premises (e.g., a private data center) or on the cloud. In one or more approaches interceptors are provided to preprocess messages, e.g., strip sensitive data, and post-process messages, e.g., inject sensitive data back into the stripped (e.g., base) message. As part of pre-processing, in an embodiment, sensitive data elements are stripped and/or removed from the messages and the sensitive data is encrypted using client-provided (e.g., originator-provided) encryption keys. In-Memory Cache (e.g., MemCacheD, Redis) is used in an aspect to store the encrypted sensitive data for a limited time period (e.g., only the time for transaction processing at the intermediary). For example, the storage duration in the In-Memory Cache can expire on or just slightly after the time to process the transaction and/or perform the functions of the intermediary. As part of post-processing, in an embodiment, the encrypted sensitive data elements are read from the secure In-Memory Cache, the sensitive data elements are cleared, removed and/or erased from the secure In-Memory Cache, and the encrypted sensitive data is decrypted and injected into the message.

The system, platform, tool, computer program product, and/or method provides a security framework for intermediaries to perform processing of transactions without having visibility or access to sensitive data and ensuring client confidentiality (e.g., through originator provided encryption keys). In one or more aspects, the system, platform, tool, framework, computer program product and/or method provides for extracting, persisting (in a transient fashion), and ingesting sensitive data into the transaction. The disclosed system, platform, tool, framework, computer program product, and/or method in one or more approaches supports high-volume and low latency processing through the use of In-Memory Cache designed in an embodiment to automatically expire the sensitive data resulting in minimal maintenance overhead.

In one or more approaches, key components of the system, platform, tool, framework, computer program product, and/or method includes one or more Interceptors, Configurable JSON Attributes List, Hardware Security Module (HSM), and In-Memory Cache. The one or more Interceptors are preferably hardware-based interceptors that will be used to intercept inbound messages and outbound messages in representational state transfer application programming interfaces (REST APIs). The hardware-based interceptor prevents or reduces the risk of compromising security while handling the sensitive data. The Configurable JSON Attributes List is a list of attributes that carry sensitive data in inbound messages and outbound messages in REST APIs. The Hardware Security Module (HSM) increases security of the data stored in In-Memory Cache as HSM will be used to encrypt and decrypt data, e.g., sensitive data, with client-provided (e.g., originator) key to avoid exposure of the encrypted (sensitive) data at intermediaries. The In-Memory Cache will be used to temporally store the sensitive data stripped from the inbound messages until the transaction processing is completed by various systems of the intermediaries. The In-Memory Cache retains the data for a limited time and does not store the data in a database or file system, and as such avoids the need to clean up (delete, erase) the sensitive data after completion of the processing in the intermediary system.

FIG. 1 illustrates an embodiment of computing environment 100 including Intermediary Computing Environment 105, private or public network 50, Originator Computing Resources 25, and Service Provider Computing Resources 75. One or more private or public networks 50 permits Originator Computing Resources 25 to communicate with Intermediary Computing Environment 105, and/or Intermediary Computing Environment 105 to communicate with Service Provider Computing Resources 75. Private or public networks 50 also permit Service Provider Computing Resources 75 to communicate with Intermediary Computing Environment 105, and/or Originator Computing Resources 25. While FIG. 1 only shows one private and/or public network 50 it can be appreciated that one or more private or public networks can provide communication between Originator Computing Resources 25, Intermediary Computing Environment 105, and/or Service Provider Computing Resources 75. In other words, in one or more embodiments each of Intermediary Computing Environment 105, Originator Computing Resources 25, and Service Provider Computing Resources 75 can communicate with each other.

Intermediary Computing Environment 105 includes one or more hardware processors 110A, 110B (also referred to as central processing units (CPUs)), an In-Memory Cache 140, main memory 150 (e.g., for storing an operating system, application program interfaces (APIs) and programs), a network interface 115, an Interceptor 135, an optional display device 120, an optional input device 125, and interconnect and/or communication channel 130, and any other features common to a computing device. In the embodiment depicted in FIG. 1, processors 110A, 110B may include, for example, a microcontroller, Field Programmable Gate Array (FPGA), or any other processor that is configured to perform various operations. Communication channels 130, e.g., wired connections such as data bus lines, address bus lines, Input/Output (I/O) data lines, video bus, expansion busses, etc., are shown for routing signals between the various components of system 100. Processors 110A, 110B are configured to execute instructions as described below. These instructions may be stored, for example, as programs and/or programmed modules in main memory 150, local memory, or an associated storage device (not shown).

With respect to configuring Intermediary Computing Environment 105 for protecting sensitive data, local memory may be configured for storing programs, modules, data, information, records, and associated meta-data, or portions thereof as needed. Local memory may include, for example, non-transitory computer readable media in the form of volatile memory, such as random-access memory (RAM) and/or cache memory or others. Local memory can receive programs, modules, data, information, records, and associated data from, for example memory 150, or over network interface 115. Associated storage may include, for example, other removable/non-removable, volatile/non-volatile storage media, such as Hard Disk Drive (HDD) or Solid-State Drive (SSD).

Network interface 115 is configured to transmit and receive data or information to and from a network 50 via one or more web servers 70 (e.g., Service Provider Computing Resources 75 and/or Originator Computing Resources 25) via wired or wireless connections. For example, network interface 115 may utilize wireless technologies and communication protocols such as Bluetooth®, WIFI (e.g., 802.11a/ b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows Intermediary Computing Environment 105 to transmit information to or receive information from servers 70 (e.g., Service Provider Computing Resources 75 and/or receive information from Originator Computing Resources 25).

Web-based server 60 can be for or attached to one or more Service Provider Computing Resources 75 for Originators (e.g., Originator Computing Resources) who desire to use Service Provider Computing Resources 75. Originator Computing Resources 25 in an embodiment are adapted and configured for originators, e.g., financial institutions, to initiate for example financial transactions. Originator Computing Resources 25 include an Originator Interface 30 (e.g., an Originator console 30), and in one or more embodiments is adapted and configured to communicate with Intermediary Computing Environment 105 and/or Service Provider Computing Resources 75. Web-based server 17 can be for or attached to one or more Originator Computing Resources 25 to connect Originator Computing Services 25 to Intermediary Computing Resources 105 and/or Service Provider Computing Resources 75. Originator Computing Resources can be configured to communicate via private and/or public communications network 50 with Intermediary Computing Environment 105 and/or Service Provider Computing Resources 75. Service Provider Computing Resources 75 in an aspect includes Service Provider interface 77, and in one or more embodiments is adapted and configured to communicate with Intermediary Computing Environment 105 and/or Originator Computing Resources 25 via private or public communications network 50. It can be appreciated that the system 100 can be set up for direct peer-to-peer communications between one or more of Intermediary Computing Environment 105, Originator Computing Resources 25, and/or Service Provider Computing Resources 75.

Optional display 120 may include, for example, a computer monitor, television, smart television, a display screen integrated into a personal computing device such as, for example, laptops, smart phones, smart watches, virtual reality headsets, smart wearable devices, or any other mechanism for displaying information to a user. In one or more aspects, display 120 may include a liquid crystal display (LCD), an e-paper/e-ink display, an organic LED (OLED) display, or other similar display technologies. In an aspect, display 120 may be touch-sensitive and may also function as an input device. In one or more embodiments, display 120 on Intermediary Computing Environment 105 may not be included or necessary. Optional input device 125 may include, for example, a keyboard, a mouse, a touch-sensitive display, a keypad, a microphone, or other similar input devices or any other input devices that may be used alone or together to provide a user with the capability to interact with the Intermediary Computing Environment 105. In one or more embodiments, input device 125 on Intermediary Computing Environment 105 may not be included or necessary.

Figure 6:
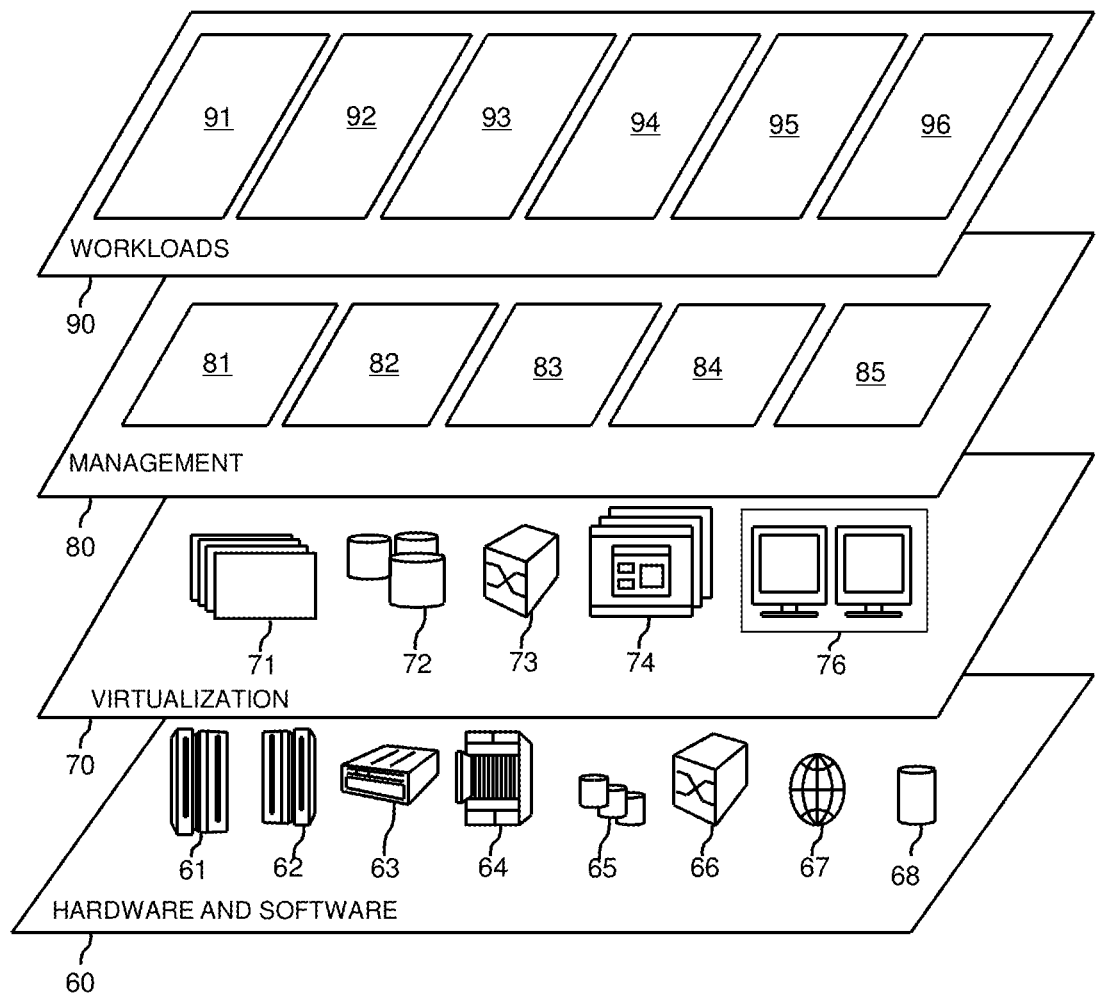
FIG. 6 depicts abstraction model layers of a cloud computing environment according to an embodiment of the disclosure.
Figure 7:
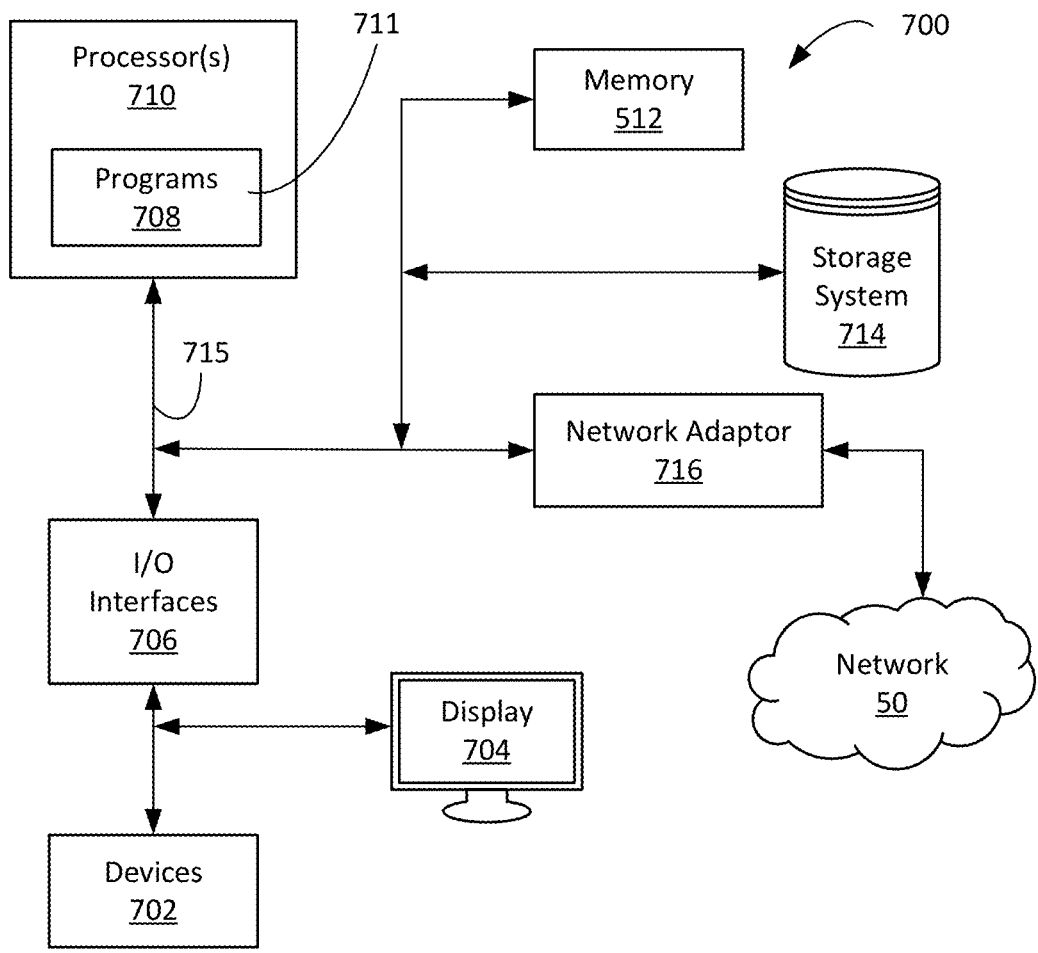
FIG. 7 illustrates a block diagram of an example computing system in which aspects of the illustrative embodiments of a system to prevent visibility by intermediaries to, and protect, sensitive data, for example, can be implemented.

In one or more aspects, Intermediary Computing Environment 105, Originator Computing Resources 25, and/or Service Provider Computing Resources 75 can include or be, for example, server computer systems, mainframe computers, distributed cloud computer systems, personal computer (PC) systems, PC networks, thin clients, thick clients, minicomputer systems, laptop devices, hand-held devices, smart devices, smart phones, set top boxes, programmable consumer electronics, multiprocessor systems, microprocessor-based systems, and/or other similar computing or processor based devices, an embodiment of which is described in more detail in FIG. 7. It will be appreciated that in one or more embodiments System 100 includes or is a distributed cloud computing environment or system as described in connection with FIGS. 5-6.

Memory 150 of Intermediary Computing Environment 105 in one or more embodiments stores processing modules that include programmed instructions adapted to run analytical models, functional units, and/or other modules 160 to load, process, analyze, assess, transform, store, and output data. Memory 150 of Intermediary Computing Environment 105 in one or more embodiments stores tools, and/or platforms that include or constitute one or more functional units (e.g., modules) 160 having programming, instructions, and/or logic for operating circuitry to provision, configure, operate, manage, monitor, and handle transactions, for example financial transactions. By way of non-limiting examples only, memory 150 may include a non-transitory medium for storing data, information, and/or instructions, including a portable computer diskette, a Hard Disk drive (HDD), Solid-State Drive (SSD), a read-only memory (ROM), an erasable programmable read-only memory (EPROM or Flash memory), a portable compact disc read-only memory (CD-ROM), an optical storage device, a magnetic storage device, and/or random access memory (RAM), and/or any suitable combination of the foregoing.

In an embodiment, one of the programmed processing modules stored at memory 150 includes a Data Ingestion Module 155 that provides instructions and logic for operating circuitry to access/read/load/process large amounts of data preferably for use by other modules (e.g., analytical and/or machine learning (ML) models) that can further process and analyze the data. In one or more embodiments, the input data for Bulk Load Module 155 comprises parties, transactions, etc., and updated data and information on the same.

In an embodiment, memory 150 includes a Governance Platform 170 that provides instructions and logic for operating circuitry to protect sensitive data. Governance Platform 170 (also referred to as Governance Module 170, Platform 170, Framework 170, Tool 170, or Module 170) preferably interfaces with inbound messages (e.g., data/information) from Originator 25, and contains programing and instructions for operating circuitry to perform pre-processing of incoming messages (e.g., payload) including: striping sensitive data from the inbound message, encrypting the sensitive data, temporally storing the encrypted sensitive data in In-Memory Cache which holds the encrypted sensitive data for a limited duration, optionally processing the inbound message without the sensitive data; and post processing including: reading the sensitive data from the In-Memory Cache, clearing the sensitive data from the In-Memory Cache, decrypting the sensitive data, and injecting the sensitive data into the stripped (e.g., base) message or updated stripped (base) message as an outbound message.

Service Provider Interface 77 contains programs, instructions and/or logic for operating circuitry to permit a third party, e.g., a service provider, to provide services to an originator, e.g., a transaction originator. Originator Interface 30 employs programs, instructions, and/or logic for operating circuitry to permit an originator, e.g., a financial institution, to employ service provider resources. API Layer 180 contains programming, instructions, and/or logic for operating circuitry to expose Intermediary Computing Resources 105 to a Representational State Transfer Application Program Interface (REST API), etc.

In one or more further embodiments, memory 150 further includes a supervisory program having instructions for configuring the system 100, e.g., the Intermediate Computing Environment 105, to call one or more, and in an embodiment all, of the program modules (e.g., APIs) 160. In an embodiment, the supervisory program calls methods and provides application program interfaces (APIs) for running and operating the Data Ingestion Module 155, and/or the Governance Platform 170. At least one application program interface (API) 195 is invoked in an embodiment to receive input data from a user, for example to run one or more of the functional units and/or modules 160, including the Governance Platform 170.

It can be appreciated that while FIG. 1 shows Computing System 100 according to an embodiment as including Intermediary Computing Environment 105, and separate Originator Computing Resources 25 and/or Service Provider Computing Resources 75, it can be appreciated that in an embodiment Intermediary Computing Environment 105 can be included within or part of the Service Provider Computing Resources 75 and/or Originator Computing Resources 25.

Figure 2:
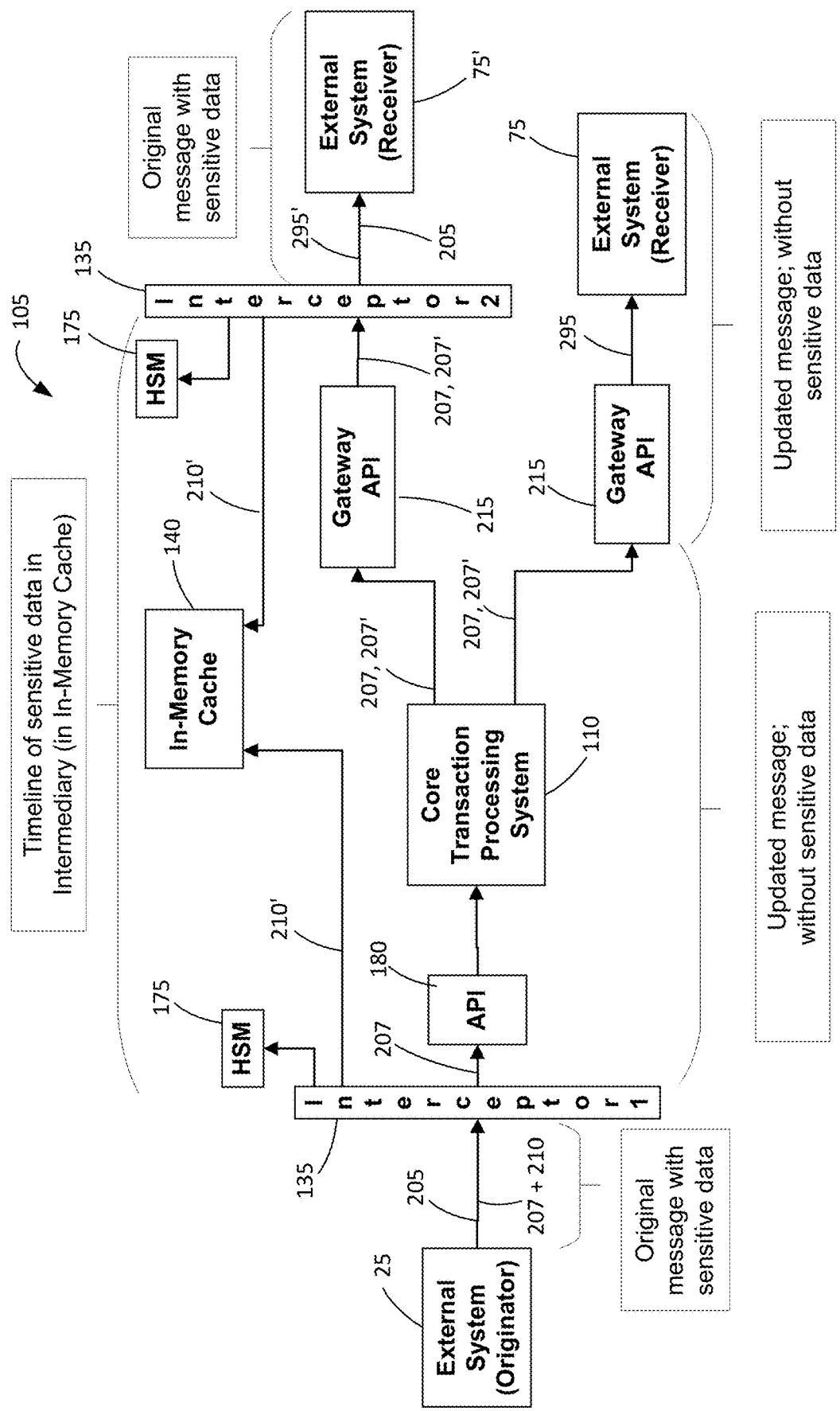
FIG. 2 illustrates a schematic block diagram of one illustrative implementation of a system to prevent visibility by intermediaries to, and protect, sensitive data not required for processing in the intermediary systems, according to an embodiment of the disclosure.

FIG. 2 illustrates a block diagram of the flow of inbound messages (with sensitive data) 205 (e.g., payload 205) from Originator Computing Resources 25 through Intermediary Computing Environment 105 to Service Provider Computing Resources (Receiver) 75. Intermediary Computing Environment 105 receives inbound messages with sensitive data 205, processes the message to strip the sensitive data 210, and transmits the outbound message 295 (without the sensitive data 210) to Service Provider Computing Resources (Receiver) 75 and transmits the outbound message 295' (with the sensitive data 210) to Service Provider Computing Resources 75. Intermediary Computing Resources 105 includes one or more Interceptors 135, Hardware Security Model (HSM) 175, Core Transaction Processing System or CPU 110, In-Memory Cache 140, and API 180. Intermediary Computing Resources 105 protects sensitive data 210 in the inbound messages 205 while permitting processing of the stripped message 207 (i.e., the inbound message 205 without the sensitive data 210). Interceptor 135 intercepts inbound messages 205 and outbound messages 295 (without sensitive data 210) in REST APIs. HSM 175 is used to encrypt the sensitive data, in an embodiment, with an encryption key provided by the originator of the inbound message 205 to avoid exposure of the sensitive data 205 at the Intermediary Computing Environment 105. In-Memory Cache 140 is used to temporally store the sensitive data 210 stripped from the inbound message 205. In a preferred embodiment In-Memory Cache 140 retains sensitive data 210 for a limited time and does not store the sensitive data 210 in a database or file. The time period that In-Memory Cache 140 retains the sensitive data 210 can vary but is typically as long as the processing of the inbound message 205 without the stripped data 210 (e.g., stripped message 207) by the core processing systems 110 within Intermediary Computing Environment 105. The time period that In-Memory Cache 140 retains the sensitive data 210 can be fixed, preset, predefined, adjustable, configurable, programmable, and/or machine learned.

In FIG. 2 incoming or inbound message 205 containing sensitive data 210 received by Intermediate Computing Environment 105 is intercepted by interceptor 135 where interceptor 135 preferably decrypts the input message 205 using keys exchanged as part of the secure transport protocol (e.g., two-way Transport Layer Security). The Interceptor 135 detects whether the inbound or input message 205 contains sensitive data 210. The Interceptor 135 uses Hardware Security Module (HSM) 175 to encrypt the sensitive data 210 forming encrypted sensitive data 210', preferably with encryption keys provided by Originator (e.g., the client) 25. The encryption keys are exchanged through agreed methods (e.g., key exchange protocols or out-of-band). The Interceptor 135 stores the encrypted sensitive data 210' in In-Memory Cache 140. The In-Memory Cache 140 holds the encrypted sensitive data 210' in an embodiment for a predefined expiry period.

The stripped message 207, i.e., the inbound message 205 without the sensitive data 210, is passed onto the core transaction processing system 110 for processing in the Intermediary Computing Environment 105. In an aspect, the Intermediary Computing Environment invokes API 180 for further processing of base message 207 by the processing systems in Intermediary Computing Environment 105. The stripped message 207 with optional additional processing is referred to as stripped message 207'. The stripped message 207, or stripped message 207' without further enrichment and/or processing in the Intermediary Computing Environment 105, is passed onto Receiver Computing Resources 75, e.g., Service Processor Computing Resources 75. The stripped message 207, 207' without sensitive data 210 is output with or without additional enrichment and/or processing by Intermediary Computing Environment 105 as outbound message 295. In response to the Intermediary Computing Environment 105 completing processing, for example by Core Processing System 110, Intermediary Computing Environment 105 invokes REST APIs provided by Receiver Computing systems 75, e.g., Service Provider Computing Systems 75. The message 295 (without the sensitive data 210) reaches Receiver Computing Systems 75 for downstream processing.

In response to, or just prior to, the Intermediary Computing Environment 105 completing processing of the inbound message 205, the Intermediary Computing Environment 105 invokes the REST APIs (Gateway API 215) provided by the Receiver Computing System 75, e.g., the Service Provider Computing System 75. In response to the outbound REST API (e.g., API 215) invocation exiting the Intermediary Computing Environment 105, the Interceptor 135 retrieves the encrypted sensitive data 210' from the In-Memory Cache 140 and removes the encrypted sensitive data 210' from the In-Memory Cache 140. The Interceptor 135 uses HSM 175 to decrypt the encrypted sensitive data 210', preferably with the encryption keys provided by the Originator (e.g., the client) 25, to obtain the sensitive data 210. The Interceptor 135 further injects the sensitive data 210 into the base message 207 (or enriched message 207'). The Inceptor 135 preferably then encrypts the output message 295' (the stripped message 207, 207' combined with sensitive data 210), preferably with keys exchanged as part of agreed methods, (e.g., a secure transport protocol (e.g., a two-way Transport Layer Security), and the Interceptor 135 permits the API innovation to reach External Systems 75' (e.g., Service Provider Computing Resources 75') with outbound message 295'. It can be appreciated that External Systems 75' can be different than External Systems 75, and that External Systems 75' receives stripped outbound message 295' with stripped sensitive data 210 while External Systems 75 receives outbound message 295 without sensitive data 210.

Figure 3:
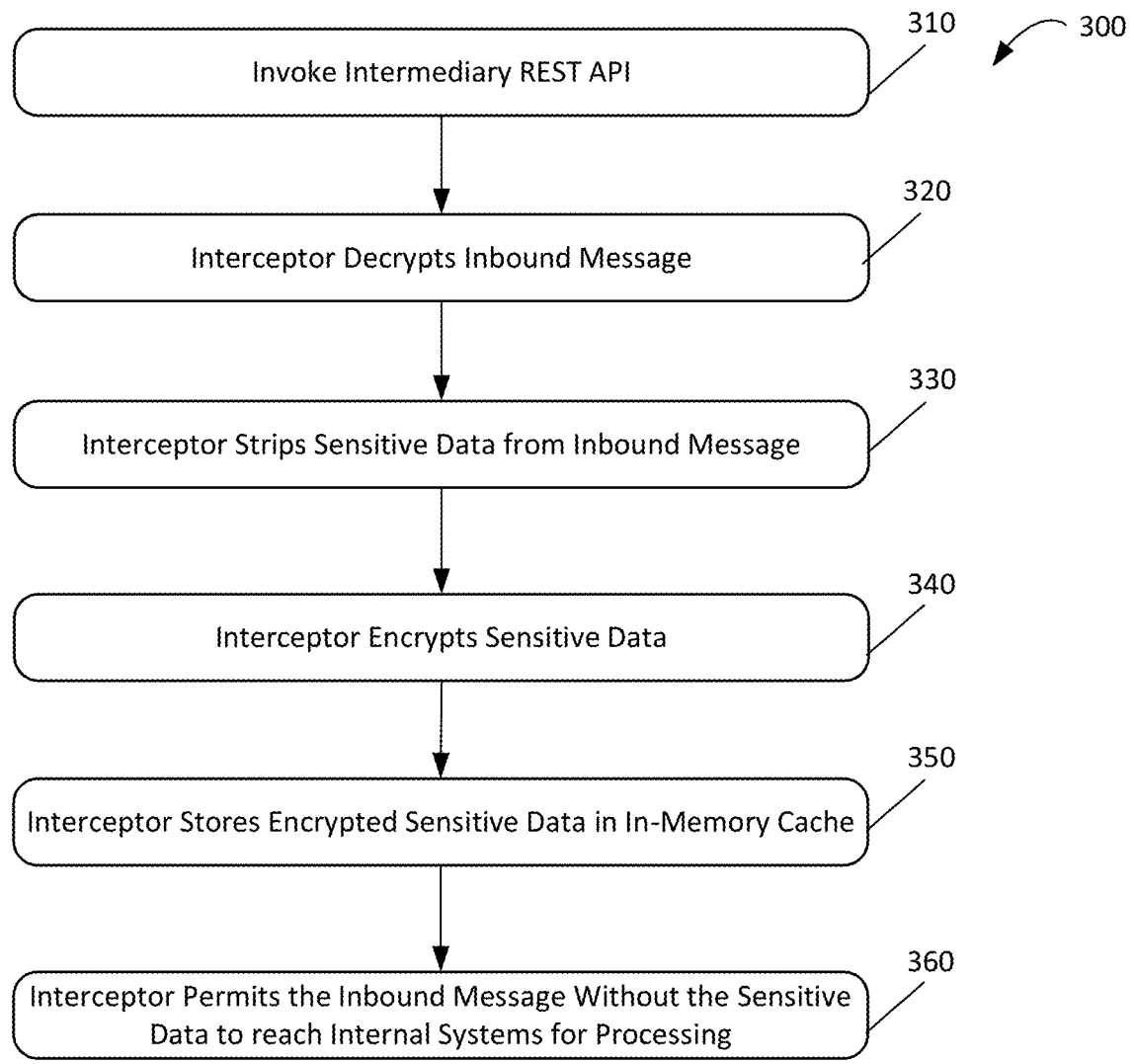
FIG. 3 illustrates a flow chart of an illustrative embodiment of a method of preprocessing messages and/or information to protect sensitive data, including sensitive data not required for processing in intermediary systems, according to an embodiment of the disclosure.

FIG. 3 illustrates a flow chart of one illustrative embodiment showing a method 300 of protecting sensitive data, for example, to permit downstream processing by Intermediaries and Service Providers, and more particularly a method of protecting sensitive data in an incoming message (e.g., in a payload) from an external processing system. Method 300 in an aspect relates to preprocessing an incoming message to protect the sensitive data. While the method 300 is described for the sake of convenience and not with an intent of limiting the disclosure as comprising a series and/or a number of steps, it is to be understood that the process 300 does not need to be performed as a series of steps and/or the steps do not need to be performed in the order shown and described with respect to FIG. 3, but the process 300 may be integrated and/or one or more steps may be performed together, simultaneously, or the steps may be performed in the order disclosed or in an alternate order.

In process 300, an incoming or inbound message (e.g., message 205) is sent by an external computing system, e.g., an Originator Computing Resources 25 to intermediary computing system, e.g., Intermediary Computing Environment 105. In response to the incoming or inbound message, at 310 the intermediary REST API, e.g., the Intermediary Computing Environment REST API, is invoked, preferably by an External Computing System, e.g., Originator Computing Resources 25. In response to the API invocation entering the intermediary, e.g., the Intermediary Computing Environment 105, an Interceptor at 320 decrypts the inbound or incoming message. In an embodiment, the Interceptor decrypts the incoming or inbound message using encryption keys exchanged as part of the secure transport protocol, e.g., two-way Transport Layer Security. It can be appreciated that keys can be exchanged through other methods, including, for example, where the encryption keys are exchanged out-of-band. At 330 the Interceptor strips the sensitive data from the input (inbound) message. In an aspect, the Interceptor inspects the input or inbound message for a set of attributes containing the sensitive data and strips the values of those attributes from the input or inbound message. In this regard, a configurable JSON Attributes List is provided, created, and/or generated to identify attributes that contain sensitive data in inbound messages, and in an embodiment, sensitive data in inbound messages and outbound messages in REST APIs. Attributes can be added to or removed from the attributes list according to new requirements (e.g., new security requirements) and evolving message sets.

Process 300 continues where at 340 the sensitive data is encrypted, preferably by the Interceptor. In one or more embodiments, the Interceptor uses Hardware Security Module (HSM) to encrypt the sensitive data, preferably using encryption keys provided by the originator of the inbound message. That is, to increase security of sensitive data stored in In-Memory Cache, HSM will be used to encrypt the sensitive data with an originator-provided encryption key to avoid exposure of the sensitive data at the intermediary, e.g., at the Intermediary Computing Environment 105. The Inceptor at 350 stores the encrypted sensitive data in In-Memory Cache 140. In an embodiment, encrypted sensitive data is only temporarily retained in In-Memory Cache. The duration that sensitive data (e.g., encrypted sensitive data) is retained in In-Memory Cache can vary and is typically a function or related to the amount of time that base message 207 is processed in Intermediary Computing Environment 105. In-Memory Cache preferably automatically removes and/or erases sensitive data resulting in minimal maintenance overhead. In one or more embodiments, In-Memory Cache can be MemCacheD and/or Redis. At 360 the input or inbound message without the sensitive data optionally can be further processed. In an approach, the Inceptor permits the inbound message stripped of the sensitive data to reach the internal systems of the intermediary for further processing.

Figure 4:
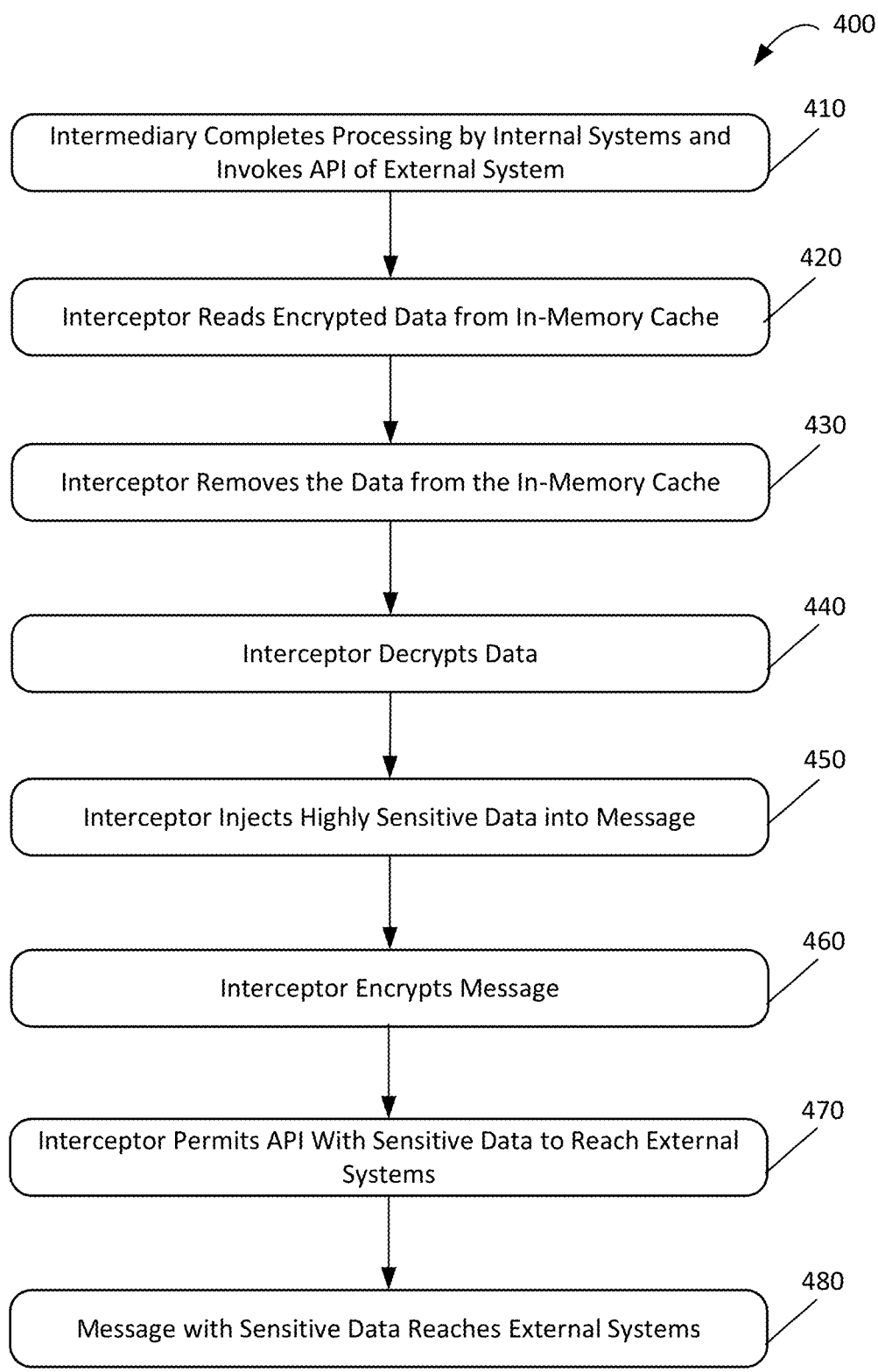
FIG. 4 illustrates a flow chart of an illustrative embodiment of a method of postprocessing of messages and/or information, for example to propagate sensitive data to downstream processing services, according to an approach of the disclosure.

FIG. 4 illustrates a flow chart of an illustrative embodiment showing a method 400 of protecting sensitive data, for example, to permit downstream processing by Intermediaries and Service Providers, and more particularly to injecting sensitive data back into an outbound message. While the method 400 is described for the sake of convenience and not with an intent of limiting the disclosure as comprising a series and/or a number of steps, it is to be understood that the process 400 does not need to be performed as a series of steps and/or the steps do not need to be performed in the order shown and described with respect to FIG. 4, but the process 400 may be integrated and/or one or more steps may be performed together, simultaneously, or the steps may be performed in the order disclosed or in an alternate order.

In process 400 the message without the sensitive data may or may not have been subject to further processing. At 410 processing in the intermediary, e.g., Intermediary Computing Environment 105, will be complete. For example, after transaction processing, the message will be ready to exit the intermediary and at 410 the API of the external receiving system, e.g., Receiver or Service Provider Computing Resources 75, will be invoked, preferably by the intermediary. In response to the REST API of the external receiving system being invoked, for example by the intermediary, the Interceptor at 420 retrieves and/or reads the encrypted sensitive data from the In-Memory Cache, and at 430 removes the encrypted sensitive data from the In-Memory Cache. At 440 the encrypted sensitive data retrieved from the In-Memory Cache is decrypted. In one or more embodiments, at 440 the Interceptor decrypts the encrypted sensitive data retrieved from In-Memory Cache, and in a preferred embodiment the encrypted sensitive data is decrypted using a client key, preferably using HSM with the originator supplied encryption keys. For example, at 440 Interceptor uses HSM to decrypt the encrypted sensitive data with encryption keys supplied by the originator, e.g., the entity that sent the inbound message.

At 450 the sensitive data is injected into the stripped or enriched message, and in an aspect the Inceptor injects the sensitive data into the stripped or enriched message. In an embodiment, at 450 the sensitive data is injected into the stripped message, or the enriched message for the configurable set of attributes, as for example determined by the Configurable JSON Attribute List. At 460 the outbound message, which includes the sensitive data injected into the stripped or enriched message, is encrypted before it is sent out of the intermediary. In one or more approaches, at 460 the stripped message injected with sensitive data, e.g., the outbound message, is encrypted by the interceptor with keys exchanged as part of the secure transport protocol (e.g., the two-way Transport Layer Security) or other agreed exchange methods (e.g., out-of-band exchange of encryption keys). At 470 the REST API with the sensitive information reaches the external systems, e.g., Service Provider Computing Resources 75. In an embodiment, at 470, the interceptor permits the API with the sensitive information to reach an external receiver system, e.g., and external receiver that requires the sensitive data, for further processing. In an approach, at 480, the message with sensitive data (e.g., outbound message 295') reaches the external receiver system, and in an aspect the message without the sensitive data (e.g., the outbound message 295) reaches another external receiver system, e.g., an external receiver that does not require the sensitive data.

It will be appreciated that the process 300 refers to an Interceptor and that process 400 also refers to an Interceptor, and it will further be appreciated that the Interceptor of process 300 can be the same Interceptor as process 400, or in an alternative embodiment two different Interceptors can be used in process 300 and process 400, a different Interceptor in each of process 300 and process 400. It will further be appreciated that the processes 300 and 400 of FIGS. 3-4 can be combined to protect sensitive data for processing by and intermediary and to handoff to a downstream receiver or service provider.

It will be understood that one or more blocks of the flowchart illustrations in FIGS. 3-4 and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a (non-transitory) computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Cloud computing is a model of service delivery for enabling convenient, on-demand network access to a shared pool of configurable computing resources (e.g., networks, network bandwidth, servers, processing, memory, storage, applications, virtual machines, and services) that can be provisioned and released through a service provider or vendor. This model can include one or more characteristics, one or more service models, and one or more deployment models. Characteristics can include, for example, on-demand service; broad network access; resource pooling; rapid elasticity; and/or measured services. Service models can include, for example, software as a Service (SaaS), Platform as a Service (PaaS), and/or Infrastructure as a Service (IaaS). Deployment models can include, for example, private cloud; community cloud; public cloud; and/or hybrid cloud. A cloud computing environment is typically service oriented with a focus on statelessness, low coupling, modularity, and semantic interoperability. Typically at the heart of cloud computing is an infrastructure that includes a network of interconnected nodes. Computing Security System 100 and/or Intermediary Computing Environment 105 can take advantage of cloud computing to protect sensitive data when subject to a processing chain by one or more computing resources or nodes.

Figure 5:
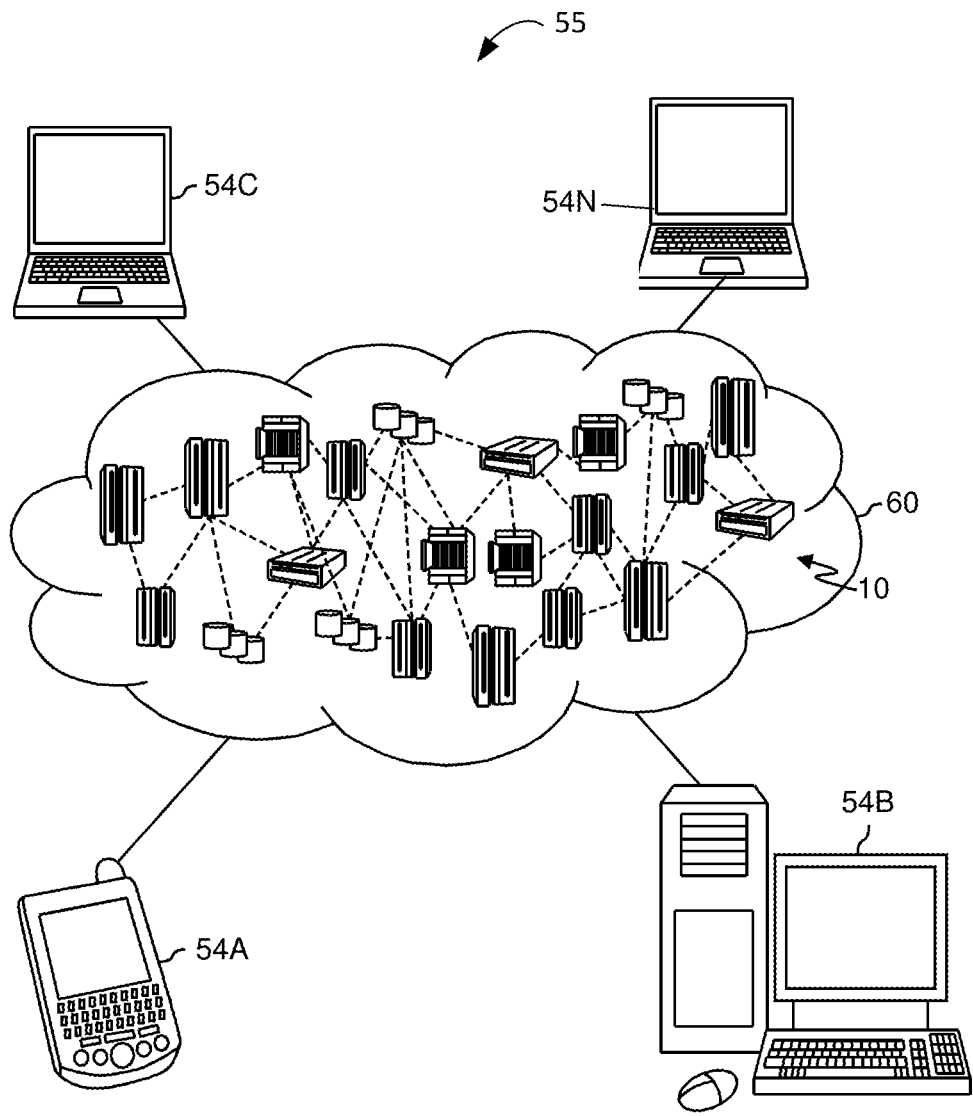
FIG. 5 depicts a cloud computing environment according to an embodiment of the disclosure.

Referring now to FIG. 5, illustrative cloud computing environment 55 is depicted. As shown, cloud computing environment 55 includes one or more cloud computing nodes 10 with which local computing devices used by cloud consumers, such as, for example, personal digital assistant (PDA) or mobile (smart) telephone 54A, desktop computer 54B, laptop computer 54C, and/or servers 54N may communicate. Nodes 10 may communicate with each other. They may be grouped (not shown) physically or virtually, in one or more networks, such as Private, Community, Public, or Hybrid clouds, or a combination thereof. This allows cloud computing environment 55 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 55 can communicate with any type of computerized device over any type of network and/or network addressable connection (e.g., using a web browser). Originator Computing Resources 25, Intermediary Computing Environment 105, and/or Service Provider (Receiver) Computing Resources 75 can constitute or include computing resources 54 (e.g., 54A-54N) shown in FIG. 5.

Referring to FIG. 6, a set of functional abstraction layers provided by cloud computing environment 55 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components can include: mainframes 61; RISC (Reduced Instruction Set Computer) architecture based servers 62; servers 63; blade servers 64; storage devices 65; and network and networking components 66. In some embodiments, software components include network application server software 67 and database software 68.

Virtualization layer 70 provides an abstraction layer from which the flowing examples of virtual entities may be provided: virtual servers 71; virtual storage 72; virtual networks 73, including virtual private networks; virtual applications and virtual operating systems 74; and virtual clients 76.

In one example, management layer 80 may provide the functions described below. Resource provisioning 81 provides procurement, preferably dynamic procurement, of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. Other functionality as illustrated by workload layer 96 is contemplated.

FIG. 7 illustrates an example computing and/or data processing system 700 in which aspects of the present disclosure may be practiced. Computing system 700 in an example can be representative of Originator Computing Resources 25, Service Provider Computing Resources 75, and/or the computing devices or aspects of Intermediary Computing Environment 105. It is to be understood that the computer and/or data processing system 700 depicted is only one example of a suitable system and is not intended to suggest any limitation as to the scope of use or functionality of embodiments of the present invention. For example, the Originator Computing Resources 25, Service Provider Computing Resources 75, and/or Intermediary Computing Resources 105 shown may be operational with numerous other special-purpose computing system environments or configurations. Examples of well-known computing systems, environments, and/or configurations illustrated by FIG. 7 may include, but are not limited to, server computer systems, mainframe computers, distributed cloud computer systems, personal computer (PC) systems, PC networks, thin clients, thick clients, minicomputer systems, handheld or laptop devices, multiprocessor systems, microprocessor-based systems, smart phone, set top boxes, programmable consumer electronics, and the like that include any of the above systems or devices, and the like.

In some embodiments, the computer system 700 may be described in the general context of computer system executable instructions, embodied as program modules stored in memory 712, being executed by the computer system. Generally, program modules may include routines, programs, objects, components, logic, data structures, and so on that perform particular tasks and/or implement particular input data and/or data types in accordance with the present invention.

The components of the computer system 700 may include, but are not limited to, one or more processors or processing units 710, a memory 712, and a bus 715 that operably couples various system components, including memory 712 to processor 710. In some embodiments, the processor 710, which is also referred to as a central processing unit (CPU) or microprocessor, may execute one or more programs or modules 708 that are loaded from memory 712 to local memory 711, where the program module(s) embody software (program instructions) that cause the processor to perform one or more operations. In some embodiments, module 708 may be programmed into the integrated circuits of the processor 710, loaded from memory 712, storage device 714, network 50 (e.g., from Intermediary Computing Environment 105), and/or combinations thereof to local memory 711.

The processor (or CPU) 710 can include various functional units, registers, buffers, execution units, caches, memories, and other units formed by integrated circuitry, and may operate according to reduced instruction set computing ("RISC") techniques. The processor 710 processes data according to processor cycles, synchronized, in some aspects, to an internal clock (not shown). Bus 715 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 700 may include a variety of computer system readable media, including non-transitory readable media. Such media may be any available media that is accessible by the computer system, and it may include both volatile and non-volatile media, removable and non-removable media.

Memory 712 (sometimes referred to as system or main memory) can include computer readable media in the form of volatile memory, such as random-access memory (RAM), cache memory and/or other forms. Computer system 700 can further include other removable/non-removable, volatile/non-volatile computer system storage media. By way of example only, storage system 714 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 715 by one or more data media interfaces.

The computer system 700 may also communicate with one or more external devices 700 such as a keyboard, track ball, mouse, microphone, speaker, a pointing device, a display 704, etc.; one or more devices that enable a user to interact with the computer system; and/or any devices (e.g., network card, modem, etc.) that enable the computer system to communicate with one or more other computing devices. Such communication can occur via Input/Output (I/O) interfaces 706. Communications or network adapter 716 interconnects bus 715 with an outside network 50 enabling the data processing system 700 to communicate with other such systems. Additionally, an operating system such as, for example, AIX ("AIX" is a trademark of the IBM Corporation) can be used to coordinate the functions of the various components shown in FIG. 7.

The computer system 700 can communicate with one or more networks 50 such as a local area network (LAN), a general wide area network (WAN), and/or a public network (e.g., the Internet) via network adapter 716. As depicted, network adapter 716 communicates with the other components of computer system via bus 715. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

Those of ordinary skill in the art will appreciate that the hardware depicted in FIG. 7 may vary depending on the implementation. Other internal hardware or peripheral devices, such as flash memory, equivalent non-volatile memory, or optical disk drives may be used in addition to or in place of the hardware depicted. Moreover, the computing processing system 700 can take the form of any of a number of different data processing systems, including but not limited to, client computing devices, server computing devices, tablet computers, laptop computers, telephone or other communication devices, personal digital assistants, and the like. Essentially, data processing system 700 can be any known or later developed data processing system without architectural limitation.

The system and processes of the figures are not exclusive. Other systems, processes, and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java™, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatuses (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A computer-implemented method for protecting sensitive electronic data, the method comprising:
    decrypting an incoming message comprising a base message and the sensitive electronic data;
    removing the sensitive electronic data from the incoming message to create a stripped message;
    encrypting the sensitive electronic data removed from the incoming message;
    storing the encrypted sensitive electronic data in In-Memory Cache; and
    permitting the stripped message to be further processed without the sensitive electronic data.

2. The method as recited in claim 1, further comprising decrypting the incoming message with an Interceptor.

3. The method recited in claim 2, further comprising decrypting the incoming message using security keys exchanged with an external system that transmitted the incoming message.

4. The method as recited in claim 1, wherein the security keys are exchanged out of band with the incoming message.

5. The method recited in claim 1, further comprising storing the encrypted sensitive data in In-Memory Cache for a temporary time period that is at least one of a group consisting of: a fixed time period, a predefined time period, a predetermined time period, an adjustable time period, a programmable time period, and combinations thereof.

6. The method as recited in claim 1, wherein removing the sensitive electronic data from the incoming message comprises:
    identifying sensitive electronic data to check for in the decrypted incoming message; and
    checking the decrypted incoming message for the identified sensitive electronic data.

7. The method as recited in claim 6, further comprising using an attribute list to identify sensitive electronic data in the decrypted incoming messages.

8. The method as recited in claim 7, further comprising comparing the decrypted incoming message to sensitive electronic data identified in the attribute list.

9. The method as recited in claim 7, wherein the attribute list is a configurable JSON Attribute List where attributes can be at least one of a group consisting of an added attribute, a modified attribute, a removed attribute, and combinations thereof from the JSON Attribute List.

10. The method as recited in claim 1, wherein encrypting the sensitive electronic data comprises using a Hardware Security Module to encrypt the sensitive electronic data with an encryption key.

11. The method as recited in claim 10, further comprising supplying the encryption key by an external system that transmitted the incoming message.

12. The method as recited in claim 1, wherein an interceptor:
    decrypts an incoming message comprising a base message and sensitive electronic data;
    removes the sensitive electronic data from the incoming message to create a stripped message;
    encrypts the sensitive electronic data;
    stores the encrypted sensitive electronic data in In-Memory Cache; and
    permits the stripped message to be further processed without the sensitive electronic data.

13. The method as recited in claim 1, further comprising invoking an intermediary computing system REST API.

14. The method as recited in claim 1, further comprising:
    retrieving from the In-Memory Cache the encrypted sensitive electronic data;
    decrypting the encrypted sensitive electronic data retrieved from the In-Memory Cache using a Hardware Security Module; and
    injecting the sensitive electronic data into the stripped message.

15. The method as recited in claim 1, further comprising encrypting the outbound message with the sensitive electronic data and permitting the encrypted outbound message with the sensitive electronic data to reach an external computing system.

16. The method as recited in claim 15, wherein an inceptor encrypts the outbound message with a security key exchanged with an external system that transmitted the incoming message.

17. The method as recited in claim 1, further comprising an interceptor using a Hardware Security Module (HSM) to decrypt the encrypted sensitive electronic data retrieved from the In-Memory Cache.

18. The method as recited in claim 14, further comprising:
    permitting the encrypted outbound message with the sensitive electronic data to reach an external computing system; and
    permitting at least one of the stripped message without containing the sensitive electronic data or an enriched stripped message comprising the stripped message to be further processed but without containing the sensitive electronic data to reach a different external computing system.

19. A computer program product for protecting sensitive electronic data, the computer program product comprising a non-transitory computer readable storage medium having program instructions embodied therewith, the program instructions executable by a processor to cause the processor to:
    decrypt an incoming message comprising a base message and the sensitive electronic data;
    remove the sensitive electronic data from the incoming message to form a stripped message;
    encrypt the sensitive electronic data removed from the incoming message;
    store the encrypted sensitive electronic data in In-Memory Cache; and
    permit the stripped message to be further processed without the sensitive electronic data.

20. The computer program product as recited in claim 19, further comprising programming instructions that when executed by the processor cause the processor to:
    retrieve from the In-Memory Cache the encrypted sensitive electronic data;
    decrypt the encrypted sensitive electronic data retrieved from the In-Memory Cache using a Hardware Security Module (HSM);
    inject the sensitive electronic data into the stripped message to form an outbound message with the electronic sensitive data;
    encrypt the outbound message with the sensitive electronic data;
    permit the encrypted outbound message with the sensitive electronic data to reach an external computing system; and
    permit the base message that is further processed without the sensitive electronic data to reach the external computing system or a different external computing system.

* * * * *